(12) United States Patent
Sumimoto et al.

(10) Patent No.: US 6,275,398 B1
(45) Date of Patent: Aug. 14, 2001

(54) VOLTAGE CONTROL APPARATUS FOR VEHICLE-ONBOARD ELECTRIC GENERATOR

(75) Inventors: Katsuyuki Sumimoto; Tatsuki Kouwa; Keiichi Komurasaki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/756,241

(22) Filed: Jan. 9, 2001

(30) Foreign Application Priority Data

Jun. 27, 2000 (JP) .................................................. 12-193034

(51) Int. Cl.[7] .................................................. H02M 7/155
(52) U.S. Cl. .............................................. 363/89; 307/10.1
(58) Field of Search ................................... 363/78, 84, 89, 363/125, 126, 127; 322/28; 318/151; 307/10.1

(56) References Cited

U.S. PATENT DOCUMENTS

| 4,275,344 | * | 6/1981 | Mori et al. ............................. 322/28 |
| 5,444,354 | * | 8/1995 | Takahashi et al. ..................... 322/28 |
| 5,608,310 | * | 3/1997 | Watanabe ................................ 322/9 |
| 5,687,066 | * | 11/1997 | Cook, II ................................. 363/89 |
| 5,847,520 | * | 12/1998 | Theurillat et al. ................... 318/139 |
| 5,936,314 | * | 8/1999 | Suganuma et al. ................. 307/10.1 |

FOREIGN PATENT DOCUMENTS 2-36734 2/1990 (JP) .

* cited by examiner

Primary Examiner—Adolf Deneke Berhane
(74) Attorney, Agent, or Firm—Sughrue, Mion, Zinn, Macpeak & Seas, PLLC

(57) ABSTRACT

A voltage control apparatus for a vehicle-onboard electric generator in which wirings inclusive of connectors of the motor vehicle are much simplified to allow the manufacturing cost to be reduced significantly while making the trigger signal constantly available without difficulty even when abnormality takes place in association with the charge lamp. The voltage control apparatus includes a voltage control circuit (1A) for controlling a generated voltage of a vehicle-onboard electric generator (2), an external control unit (5A) for supplying a trigger signal to the voltage control circuit (1A), and a single signal line for electrically interconnecting a first terminal of the voltage control circuit (1A) and a first port of the external control unit (5A), wherein the external control unit (5A) is so designed as to output the trigger signal to the voltage control circuit (1A) by way of the single signal line, and wherein the voltage control circuit (1A) is so designed that upon occurrence of abnormality in the vehicle-onboard electric generator (2), the voltage control circuit (1A) informs the external control unit (5A) of abnormality occurrence status through the medium of the single signal line.

19 Claims, 7 Drawing Sheets

VOLTAGE CONTROL APPARATUS FOR VEHICLE-ONBOARD ELECTRIC GENERATOR

BACKGROUND OF THE INVENTION

1. Field of the Invention

The present invention relates to a voltage control apparatus for an electric generator mounted on an automobile or motor vehicle (hereinafter referred to as the vehicle-onboard electric generator). More particularly, the present invention is concerned with a voltage control apparatus for a vehicle-onboard electric generator which apparatus can ensure easy availability of a starting or triggering signal regardless of occurrence of abnormality in a charge lamp.

2. Description of Related Art

For having better understanding of the concept underlying the present invention, description will first be made in some detail of a conventional voltage control apparatus for a vehicle-onboard electric generator. FIG. 7 is a block diagram showing generally and schematically an exemplary arrangement of a hitherto known or conventional voltage control circuit for a vehicle-onboard AC generator or alternator which is disclosed, for example, in Japanese Patent Publication No. 2707616.

Referring to FIG. 7, reference numeral 2 denotes a vehicle-onboard electric generator (alternator). For regulating or controlling the output voltage of the vehicle-onboard electric generator, there is provided a voltage control circuit (regulator) denoted generally by reference numeral 1. The voltage control circuit 1 is provided with an output terminal B which is electrically connected to the output terminals of the vehicle-onboard generator 2 and a battery 6, respectively, a lamp input terminal L, a monitoring output terminal FR connected to an external control unit 5 and a control input terminal G.

The voltage control circuit 1 is so designed that operation thereof is triggered or started when the voltage applied to the lamp input terminal L exceeds a predetermined value. Applied to the lamp input terminal L is a battery voltage VB supplied from the battery 6 by way of an ignition switch 3 and a charge lamp 4.

The vehicle-onboard electric generator 2 is comprised of a field coil 21 provided in a rotor (not shown) which is interlocked with an internal combustion engine (not shown), an armature coil 22 provided in a stator (not shown either) and a full-wave rectifier 23 for performing full-wave rectification of a three-phase generator voltage derived from the armature coil 22.

The full-wave rectifier 23 is implemented in the form of a three-phase parallel-connected diode bridge circuit. The field coil 21 and the full-wave rectifier 23 have respective ends both connected to the output terminal of the battery 6.

The external control unit 5 constituted by a conventional electronic control unit (hereinafter also referred to as the ECU in short) is designed not only to generate a starting or trigger signal for starting or triggering operation of the voltage control circuit 1 but also to acquire an abnormality message signal issued by the voltage control circuit 1 to thereby stop or interrupt the operation of the voltage control circuit 1.

To this end, the external control unit 5 is composed of a CPU (Central Processing Unit) 51 which is in charge of controlling the voltage control circuit 1 as well as operation of the engine, resistors 52, 54 and 55 connected to the CPU 51, a Zener diode 53 and an output transistor 56.

Connected to the external control unit 5 are a variety of sensors known in the art (not shown) for supplying to the external control unit 5 various detection signals such as an engine rotation number signal (engine speed signal) Ne indicating engine operation state inclusive of engine speed in rpm, a signal indicating a depression stroke of an accelerator pedal of the motor vehicle (hereinafter also referred to as the accelerator pedal depression stroke), a signal indicating cooling water temperature Tw and the like signal which are required for carrying out the operation control of the internal combustion engine.

On the other hand, the CPU 51 is provided with a power supply port a which is connected to a junction between the resistor 52 and the cathode of the Zener diode 53, and the battery voltage VB is applied to the power supply port a by way of the resistor 52. Further, the CPU 51 is provided with an operation triggering port b which is connected to the output terminal of the ignition switch 3 by way of the resistor 54. Furthermore, the CPU 51 is equipped with a monitoring input port c which is connected to the output terminal of the ignition switch 3 by way of the resistor 55 and additionally connected to the monitoring output terminal FR of the voltage control circuit 1.

In addition, the CPU 51 has a control output port d which is connected to the base of an emitter-grounded output transistor 56, the collector of which is connected to a control input terminal G of the voltage control circuit 1. In addition, the CPU 51 is equipped with a ground port e which is electrically connected to the ground potential.

The voltage control circuit 1 includes an output transistor 101 for controlling the electrical conduction ratio of the field coil 21 which corresponds to the field current of the electric generator 2 and a diode 102 electrically inserted between the collector of the output transistor 101 and the field coil 21. The output transistor 101 has a base electrically connected to the collector of a transistor 103 and additionally to a constant source voltage Vcc via a resistor 104. On the other hand, the base of the transistor 103 is connected to the output terminal of a comparator 105 which can be implemented by using a conventional differential amplifier.

The comparator 105 has a reference input terminal (−) which is connected to a junction of voltage dividing resistors 106 and 107 inserted in series to each other between the constant source voltage Vcc and the ground potential, while the comparison input terminal (+) of the comparator 105 is connected to a junction between voltage dividing resistors 108 and 109 which are inserted in series to each other between the output terminal of the vehicle-onboard generator 2 and the ground potential.

Further, the comparison input terminal (+) of the comparator 105 is connected to the collector of a transistor 112 by way of a resistor 110. On the other hand, the base of the transistor 112 is connected to the constant source voltage Vcc by way of a resistor 111.

Further, the voltage control circuit 1 includes a diode 113 connected to a one-phase output terminal of the armature coil 22, a capacitor 114 connected between the cathode of the diode 113 and the ground potential, a series connection of a diode 115 and a transistor 116 inserted between the lamp input terminal L and the ground potential, and a diode 117 inserted between the monitoring output terminal FR and the field coil 21.

In the voltage control circuit 1, the monitoring output terminal FR is connected via the diode 117 to the output transistor 101 which is designed to serve for voltage application control of the field coil 21.

Furthermore, the voltage control circuit 1 includes a fault diagnosis circuitry 118, a power generation detecting circuitry 119, an L-terminal level discriminating circuitry 120, an operation trigger circuitry 121 and a constant-voltage power supply circuitry 122.

The power generation detecting circuitry 119 is connected to the one-phase output terminal of the armature coil 22 via a diode 113 for detecting the electric power generation state on the basis of the one-phase output terminal, where the signal indicating the result of the detection is supplied to both the fault diagnosis circuitry 118 and the operation trigger circuitry 121.

The fault diagnosis circuitry 118 is designed to drive the transistor 116 in dependence on the output signal of the power generation detecting circuitry 119, which signal indicates the detected electric power generation state. The L-terminal level discriminating circuitry 120 and the operation trigger circuitry 121 are inserted between the lamp input terminal L and the constant-voltage power supply circuitry 122.

Next, description will be directed to operation of the conventional voltage control apparatus for the vehicle-onboard electric generator implemented in the structure described above by reference to FIG. 7.

Referring to FIG. 7, upon closing of the ignition switch 3, the battery voltage VB is applied to the lamp input terminal L of the voltage control circuit 1 via the charge lamp 4.

In response to the application of the battery voltage VB, both the L-terminal level discriminating circuitry 120 and the operation trigger circuitry 121 incorporated in the voltage control circuit 1 are brought into operation, whereby the constant source voltage Vcc is supplied to the constant-voltage power supply circuitry 122 to thereby trigger operation of the voltage control circuit 1.

Simultaneously, upon application of the constant source voltage Vcc, operation of the comparator 105 is triggered with a base current being fed to the output transistor 101 via the resistor 104. Thus, the output transistor 101 is switched to the conducting state, which results in that a field current flows through the field coil 21. In this manner, the vehicle-onboard generator 2 is put into the state capable of electric power generation.

At this time point, however, the output signal of the comparator 105 is still in the state "OFF". Thus, the transistor 103 remains in the off-state (i.e., electrically nonconducting state). Further, since the power generation signal (i.e., signal indicating the electric power generation) is not yet inputted to the electric power generation detecting circuitry 119 designed for detection of the one-phase output power of the vehicle-onboard generator 2, the transistor 116 is turned on (i.e., switched to the electrically conducting state) through the medium of the fault diagnosis circuitry 118, causing the charge lamp 4 to light.

Now, let's suppose that the vehicle-onboard electric generator 2 starts electric power generation upon starting of operation of the engine of a motor vehicle. Then, the power generation detecting circuitry 119 detects the voltage as generated. As a result of this, the transistor 116 is turned off through the medium of the fault diagnosis circuitry 118, which results in extinction (deenergization) of the charge lamp 4.

Subsequently, when the generated voltage supplied from the vehicle-onboard generator 2 rises, the voltage applied to the comparison input terminal (+) of the comparator 105 will increase. More specifically, a voltage resulting from voltage division of the generated voltage through cooperation of the voltage dividing resistors 108 and 109, the resistor 110 and the transistor 112 is applied to the comparison input terminal (+) of the comparator 105.

On the other hand, a reference voltage derived from the constant source voltage Vcc through voltage division by the voltage dividing resistors 106 and 107 is applied to the reference input terminal (−) of the comparator 105. Thus, when the voltage applied to the comparison input terminal (+) becomes higher than the reference voltage applied to the reference input terminal (−), the output signal of the comparator 105 assumes the state or level "ON".

Consequently, the transistor 103 is turned on while the output transistor 101 is turned off.

In this way, every time the divided voltage derived from the generated voltage exceeds the reference voltage, the output transistor 101 is turned off, whereby the field current is caused to decrease with the generated voltage being lower.

By contrast, the voltage resulting from the voltage division of the generated voltage becomes lower than the reference voltage inclusive, the transistor 103 is turned off, which results in that the output transistor 101 again assumes the conducting state (on-state), which leads to increasing of the field current and hence to rising of the generated voltage.

Through repetition of the operations described above, the conduction ratio of the field coil 21 is so regulated that the generated voltage of the vehicle-onboard generator 2 is controlled to remain substantially constant at a predetermined value.

Outputted from the monitoring output terminal FR of the voltage control circuit 1 is a monitor signal indicative of the conduction ratio of the field coil 21, which signal is fed to the monitoring input port c of the CPU incorporated in the external control unit 5. In this way, the CPU 51 is capable of monitoring changes of the conduction and nonconduction states (on- and off-states) of the output transistor 101 on the basis of the signal which indicates the state of the monitoring input port c and which is supplied to the CPU 51 via the resistor 55 to thereby determine discriminatively the electrical conduction ratio (which may also be termed the current conduction ratio) of the field coil 21.

Furthermore, when the transistor 56 incorporated in the external control unit 5 is turned on, a control signal is applied to the control input terminal G for changing over the generated voltage, the transistor 112 incorporated in the voltage control circuit 1 is turned off. In this way, the voltage control circuit 1 serves for changing the generated voltage of the vehicle-onboard electric generator 2.

The voltage control apparatus for the vehicle-onboard electric generator described above by reference to FIG. 7 however suffers a problem that upon occurrence of abnormality such as disconnection of wiring for the charge lamp 4, the voltage control circuit 1 of the vehicle-onboard generator 2 remains yet to be activated even when the ignition switch 3 is closed, incurring thus such undesirable situation that the vehicle-onboard generator 2 does not start the electric power generating operation even after the engine operation has been started.

Further, as can be seen from the figure, in the case where the control input terminal G for changing over the generated voltage and the monitoring output terminal FR for monitoring the electrical conduction ratio of the field coil 21 are required individually, the amount of wiring inclusive of connectors for both the control input terminal G and the monitoring output terminal FR increases, bringing about a problem in respect to the manufacturing cost of the voltage control apparatus as a whole. Namely, high cost will be involved in manufacturing the voltage control apparatus.

In recent years, there exists a trend of the lamps (or LEDs (Light Emission Diodes)) for charge indication, alternator fault alarm and others being driven by the external control unit 5, replacing the voltage control circuit 1 of the vehicle-onboard generator 2.

Consequently, the lamp input terminal L of the voltage control circuit 1 which is rendered unnecessary for the lamp driving naturally tends to be removed in view of reduction of the wiring cost. In that case, other type of trigger means will have to be provided.

As will be appreciated from the foregoing, in the conventional voltage control apparatus for the vehicle-onboard generator, the voltage control circuit 1 is put into operation in response to the trigger signal supplied by way of the charge lamp 4 and the lamp input terminal L. Accordingly, upon occurrence of abnormality in association with the charge lamp 4, operation of the voltage control circuit 1 remains yet to be triggered or started even when the ignition switch 3 is turned on (i.e., closed), thus making it impossible for the vehicle-onboard generator 2 to start the electric power generation to a serious problem.

Besides, it is noted that since the voltage control circuit 1 is provided with not only the lamp input terminal L but also the electric power generation output terminal B, the monitoring output terminal FR and the control input terminal G, respectively, lots of wirings are demanded, which aggravates complexity of circuit arrangement while providing a difficulty in realizing reduction of the manufacturing cost of the voltage control apparatus for the vehicle-onboard generator, giving rise to another problem.

SUMMARY OF THE INVENTION

In the light of the state of the art described above, it is an object of the present invention to provide an improved voltage control apparatus for a vehicle-onboard electric generator in which the trigger signal mentioned previously is easily available without fail even when abnormality should take place in association with the charge lamp.

Another object of the present invention is to provide a voltage control apparatus for a vehicle-onboard electric generator in which wirings inclusive of connectors are much simplified to allow the manufacturing cost to be reduced significantly.

In view of the above and other objects which will become apparent as the description proceeds, the present invention teaches that a signal available by way of an external control unit is made use of as the trigger signal to be inputted to the voltage control circuit.

Thus, according to a general aspect of the present invention, there is provided a voltage control apparatus for a vehicle-onboard electric generator which is driven by an internal combustion engine and which includes an armature coil and a field coil, which apparatus is comprised of a voltage control circuit including an output transistor for controlling a voltage appearing across the field coil to thereby control a generated voltage of the vehicle-onboard electric generator, an external control unit having an output for supplying a trigger signal to the voltage control circuit, and a single signal line for electrically interconnecting a first terminal of the voltage control circuit and a first port of the external control unit, wherein the external control unit is so implemented as to output the trigger signal to the voltage control circuit by way of the single signal line, and wherein the voltage control circuit is so implemented that upon occurrence of abnormality in association with the vehicle-onboard generator, the voltage control circuit informs the external control unit of abnormality occurrence status through the medium of the single signal line.

In a preferred mode for carrying out the invention, the external control unit may be so implemented as to put into operation the voltage control circuit by changing a signal level appearing at the first terminal.

In another preferred mode for carrying out the invention, the voltage control circuit may be so implemented that upon occurrence of abnormality in association with the vehicle-onboard electric generator, the voltage control circuit forcibly changes a signal level appearing at the first terminal to thereby inform the external control unit of abnormality occurrence status.

In yet another preferred mode for carrying out the invention, the voltage control apparatus for the vehicle-onboard electric generator may further include a charge lamp driving port provided in association with the external control unit, and a charge lamp electrically connected to the charge lamp driving port, wherein the voltage control circuit may preferably be so implemented that upon occurrence of abnormality in association with the vehicle-onboard electric generator, the voltage control circuit forcibly fixes the signal level appearing at the first terminal at an off-level to thereby inform the external control unit of abnormality occurrence status, and wherein the external control unit may preferably be so implemented as to respond to the abnormality occurrence status to thereby drive the charge lamp.

In still another preferred mode for carrying out the invention, the first terminal of the voltage control circuit may be implemented as a monitoring output terminal electrically connected to the field coil of the vehicle-onboard electric generator for outputting a monitor signal indicative of electrical conduction ratio of the field coil, wherein the first port of the external control unit may be implemented as a monitoring input port for fetching or receiving the monitor signal.

In a further preferred mode for carrying out the present invention, the voltage control circuit for the vehicle-onboard electric generator may further include an operation trigger means which is so implemented as to respond to a signal level of the monitor signal. In that case, the operation trigger means may preferably be so realized that when the monitor signal is at a level "OFF" and when the output transistor assumes an electrically nonconducting state or state "OFF", the operation trigger means interrupts power supply to the voltage control circuit to thereby cause electric power generation control for the vehicle-onboard electric generator to be stopped.

In yet further preferred mode for carrying out the invention, the operation trigger means of the voltage control apparatus may be so implemented that when the monitor signal is at a level "OFF" and when the state "OFF" of the output transistor has continued for a predetermined time, the operation trigger means can interrupt power supply to the voltage control circuit to thereby cause the electric power generation control for the vehicle-onboard electric generator to be stopped.

In a still further preferred mode for carrying out the present invention, the voltage control circuit of the voltage control apparatus may be provided with a first terminal implemented as a control input terminal for fetching or receiving a control signal for changing over the electric conduction ratio of the field coil. In that case, the external control unit may be provided with a fist port implemented as a control output port for outputting the control signal.

In a preferred mode for carrying out the present invention, the first terminal of the voltage control circuit may preferably be implemented as a one-phase monitoring output terminal for outputting a one-phase monitor signal indicative of the one-phase output of the vehicle-onboard electric generator, and the first port of the external control unit may preferably be implemented as a one-phase monitoring input port for fetching or receiving the one-phase monitor signal.

In another preferred mode for carrying out the invention, the external control unit should preferably be so implemented as to forcibly change the output timing of the trigger signal on the basis of information concerning engine operation states to thereby set variably an operation trigger timing, an electric power generation starting time point, operation and stop timings of the vehicle-onboard electric generator.

In yet another preferred mode for carrying out the invention, the external control unit may preferably be so implemented as to adjust and modify or alter the output timing of the trigger signal for determining the electric power generation starting time point of the vehicle-onboard electric generator on the basis of a desired rotation number of the engine in a starting operation phase thereof.

In still another preferred mode for carrying out the invention, the external control unit may be so implemented as to adjust and modify or alter the output timing of the trigger signal for thereby determining the electric power generation starting time point of the vehicle-onboard electric generator on the basis of a temperature of cooling water of the engine in the starting operation phase thereof.

In a further preferred mode for carrying out the invention, the external control unit may be so implemented as to adjust and modify or alter the output timing of the trigger signal for thereby determining the electric power generation starting time point of the vehicle-onboard electric generator on the basis of at least one of the desired rotation number (rpm) of the engine and temperature of cooling water in the starting operation phase thereof.

Further, there is provided according to another aspect of the present invention a voltage control apparatus for a vehicle-onboard electric generator which includes an armature coil and a field coil. The voltage control apparatus is comprised of a voltage control circuit including an output transistor for controlling a voltage appearing across the field coil to thereby control a generated voltage of the vehicle-onboard electric generator, and an external control unit having an output for supplying a trigger signal to the voltage control circuit. In that case, the voltage control circuit is constituted by a monitoring output terminal electrically connected to the field coil of the vehicle-onboard electric generator for outputting a monitor signal indicative of electrical conduction ratio of the field coil and a control input terminal for fetching a control signal for changing over the electrical conduction ratio of the field coil. The external control unit is provided with an operation triggering port electrically connected to an ignition switch, a monitoring input port for fetching the monitor signal from the monitoring output terminal and a control output port for outputting the control signal to be supplied to the control input terminal. The external control unit is so implemented as to respond to closing operation of the ignition switch to apply a trigger signal to the monitoring output terminal for trigger operation of the voltage control circuit. The voltage control circuit is so implemented that upon occurrence of abnormality in the vehicle-onboard electric generator, the voltage control circuit forcibly fixes a signal level appearing at the control input terminal at an off-level to thereby inform the external control unit of abnormality occurrence status.

In the voltage control apparatus for the vehicle-onboard electric generator according to the second aspect of the present invention, the voltage control apparatus should preferably include a charge lamp driving port provided in association with the external control unit, and a charge lamp electrically connected to the charge lamp driving port. In that case, the external control unit may preferably be so implemented as to respond to the abnormality occurrence status to thereby drive the charge lamp.

Further, in the voltage control apparatus for the vehicle-onboard electric generator described above, the external control unit should preferably be so implemented as to forcibly change output timing of the trigger signal on the basis of information concerning engine operation states to thereby set variously an operation trigger timing, an electric power generation starting time point, operation and stop timings of the vehicle-onboard electric generator.

Furthermore, in the voltage control apparatus for the vehicle-onboard electric generator described above, the external control unit should preferably be so implemented as to adjust and modify or alter an output timing of the trigger signal for thereby determining the electric power generation starting time point of the vehicle-onboard electric generator on the basis of a desired rotation number (rpm) of the engine in a starting operation phase thereof.

Furthermore, in the voltage control apparatus for the vehicle-onboard electric generator described above, the external control unit should preferably be so implemented as to adjust and modify or alter the output timing of the trigger signal for thereby determining the electric power generation starting time point of the vehicle-onboard electric generator on the basis of a temperature of cooling water of the engine in the starting operation phase thereof.

Furthermore, in the voltage control apparatus for the vehicle-onboard electric generator described above, the external control unit should preferably be so implemented as to adjust and modify or alter the output timing of the trigger signal for thereby determining the electric power generation starting time point of the vehicle-onboard electric generator on the basis of at least one of the desired rotation number (rpm) of the engine and temperature of cooling water in the starting operation phase thereof.

By virtue of the above arrangements described above, wirings inclusive of connectors of the motor vehicle are much simplified to allow the manufacturing cost to be reduced significantly while the trigger signal is made to be easily available even when abnormality takes place in association with the charge lamp.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
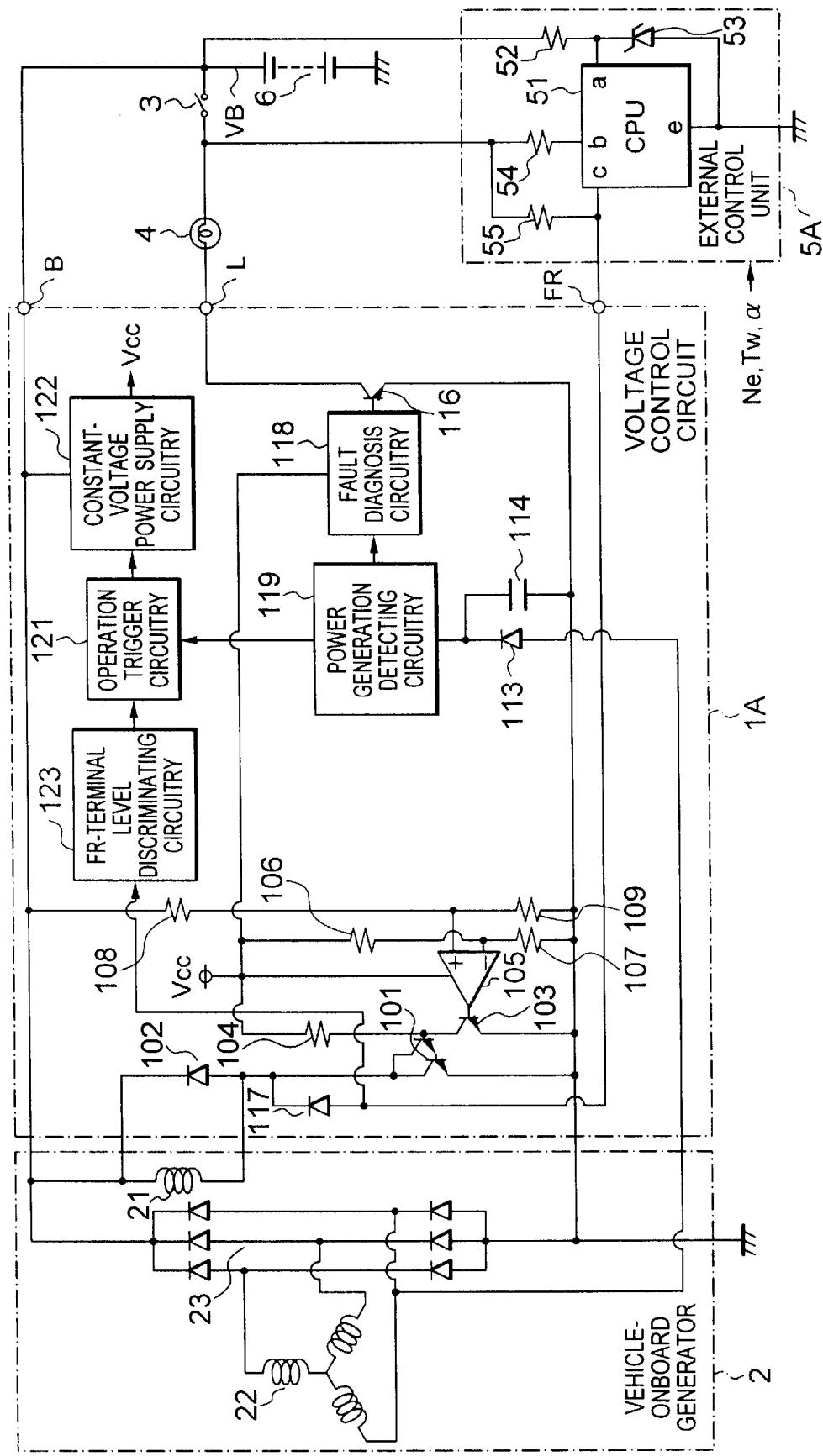
FIG. 1 is a schematic circuit diagram showing generally a structure of a voltage control apparatus for a vehicle-onboard electric generator according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, the voltage control apparatus for the vehicle-onboard electric generator according to a first embodiment of the present invention will be described in detail by reference to the drawings.

FIG. 1 is a schematic circuit diagram showing generally a structure of the voltage control apparatus according to the first embodiment of the invention. In the figure, components or parts similar or equivalent to those described hereinbefore by reference to FIG. 7 are denoted by like reference symbols affixed or not affixed with "A" as the case may be, and repeated description thereof will be omitted.

As can be seen in FIG. 1, the voltage control circuit 1A is provided with neither the control input terminal G nor the resistors 110 and 111 and the transistor 112 which are provided in association with the control input terminal G in the case of the conventional voltage control apparatus described hereinbefore.

It will further be noted that an FR-terminal level discriminating circuitry 123 is incorporated in the voltage control circuit 1A in place of the L-terminal level discriminating circuitry 120 mentioned previously.

Figure 7:
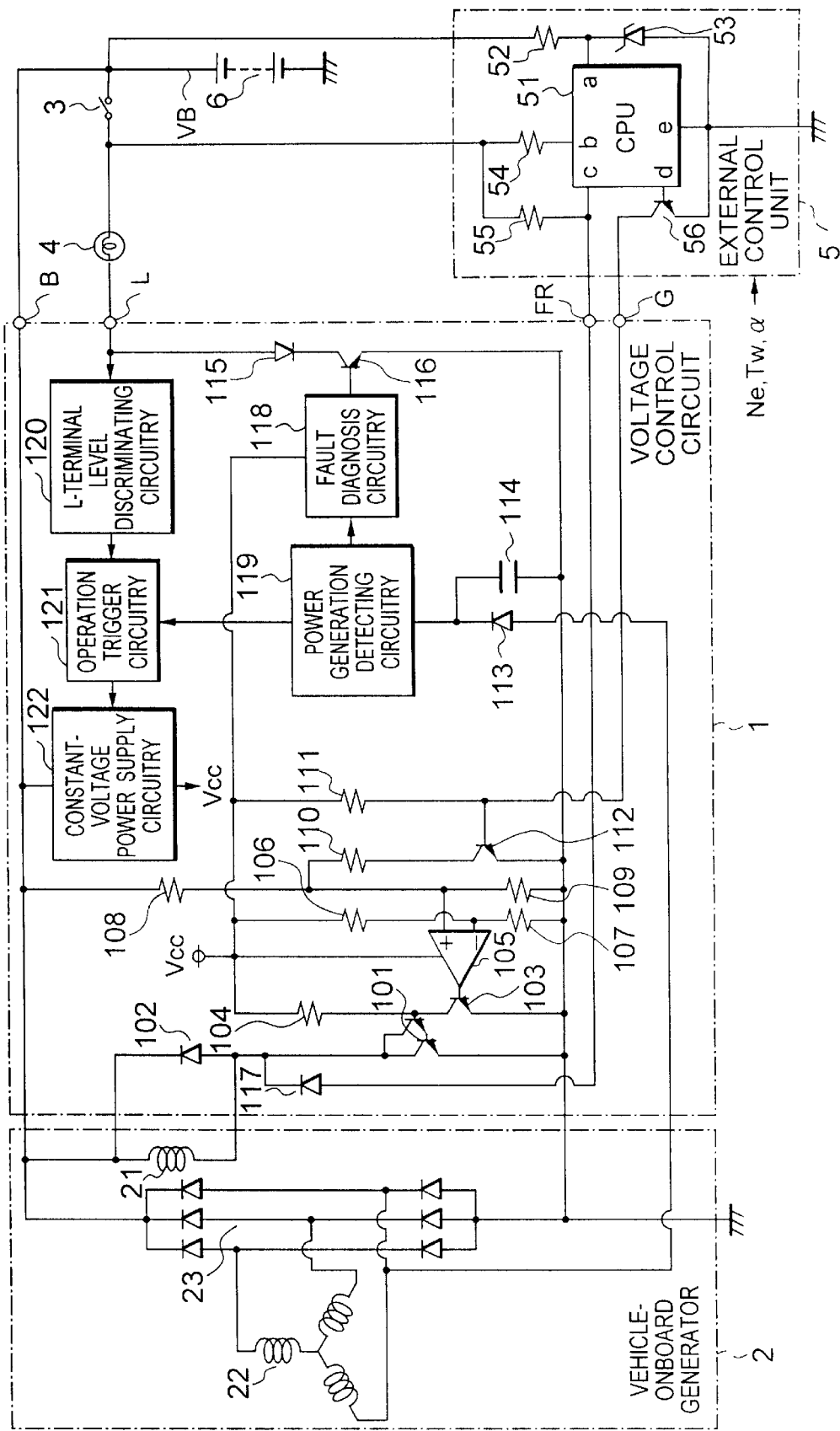
FIG. 7 is a block diagram showing generally and schematically an arrangement of a hitherto known or conventional voltage control circuit (regulator) for a vehicle-onboard AC generator.

Additionally, it can be seen from FIG. 1 that the collector of the transistor 116 incorporated in the voltage control circuit 1A is directly connected to the lamp input terminal L with the diode 115 shown in FIG. 7 being spared.

Besides, the voltage control circuit 1A is provided with only the monitoring output terminal FR as the terminal to which an external control unit 5A is to be directly connected. More specifically, the voltage control circuit 1A and the external control unit 5A are interconnected by means of a single signal line between the monitoring output terminal FR of the voltage control circuit 1A and the monitoring input port c of the CPU (Central Processing Unit) 51 of the external control unit 5A.

The external control unit 5A is designed to output the trigger signal to the voltage control circuit 1A via the single signal line. Additionally, upon occurrence of abnormality in the vehicle-onboard electric generator 2, the voltage control circuit 1A informs the external control unit 5A of abnormality occurrence status through the medium of the single signal line.

More specifically, the external control unit 5A is so implemented as to trigger operation of the voltage control circuit 1A by changing the signal level appearing at the monitoring output terminal FR. On the other hand, the voltage control circuit 1A is so implemented that upon occurrence of abnormality in the vehicle-onboard electric generator 2, the signal level appearing at the monitoring output terminal FR is forcibly changed, whereby the abnormality occurrence status is informed or messaged to the external control unit 5A in terms of change of the signal level.

As is shown in FIG. 1, the CPU 51 incorporated in the external control unit 5A is provided with neither the control output port d nor the transistor 56 described previously by reference to FIG. 7, wherein the monitoring input port c can serve for a plurality of functions relative to the monitoring output terminal FR of the voltage control circuit 1A.

Further, the FR-terminal level discriminating circuitry 123 and the operation trigger circuitry 121 incorporated in the voltage control circuit 1A cooperate to constitute an operation trigger means for the constant-voltage power supply circuitry 122.

In operation, when the level (monitor signal) appearing at the monitoring output terminal FR is "OFF" and when the logic state in which the output transistor 101 remains in the state "OFF" has continued for a predetermined time, the operation trigger means (121, 123) incorporated in the voltage control circuit 1A regards that the ignition switch 3 is opened (OFF), to thereby interrupt the power supply to the voltage control circuit 1A, as a result of which the electric power generation control for the vehicle-onboard generator 2 is forced to stop.

Ordinarily, when the ignition switch 3 is closed and when the output transistor 101 is in the off-state, the monitoring output terminal FR assumes level "ON" because of the signal applied thereto from the ignition switch 3 by way of the monitoring input port c.

In this conjunction, it is to be noted that every time the output transistor 101 is turned on through the conduction ratio control, the monitoring output terminal FR assumes low level (level "OFF").

However, in the case where the monitoring output terminal FR is at the low (OFF) level regardless of the output transistor 101 being in the off-state, this means that the ignition switch 3 is opened, and thus the operation of the engine of the motor vehicle is stopped. Consequently, electric power generating operation of the vehicle-onboard generator 2 is also stopped, as mentioned above.

Applied to the lamp input terminal L of the voltage control circuit 1A is a battery voltage VB by way of the ignition switch 3 and the charge lamp 4 which are connected in series to each other. On the other hand, the trigger signal is inputted to the monitoring output terminal FR of the voltage control circuit 1A from the external control unit 5A in response to operation of the ignition switch 3.

The voltage control circuit 1A includes the FR-terminal level discriminating circuitry 123 for discriminating the signal level making appearance at the monitoring output terminal FR in place of the L-terminal level discriminating circuitry 120 described hereinbefore by reference to FIG. 7.

The input terminal of the FR-terminal level discriminating circuitry 123 is connected to the monitoring output terminal FR, while the output terminal of the FR-terminal level discriminating circuitry 123 is connected to the constant-voltage power supply circuitry 122 by way of the interposed operation trigger circuitry 121.

Next, description will turn to operation of the voltage control apparatus for the vehicle-onboard electric generator according to the first embodiment of the present invention by reference to FIG. 1.

Firstly, the ignition switch 3 is closed. Then, the battery voltage VB is applied to the monitoring output terminal FR of the voltage control circuit 1A via the resistor 55 incorporated in the external control unit 5A.

As a result, the voltage appearing at the monitoring output terminal FR rises up. Consequently, the constant-voltage power supply circuitry 122 is put into operation through the medium of the FR-terminal level discriminating circuitry 123 and the operation trigger circuitry 121 both incorporated in the voltage control circuit 1A. Thus, the supply of the source voltage Vcc from the constant-voltage power supply circuitry 122 is enabled.

Upon application of the source voltage Vcc, a base current is supplied to the output transistor 101 via the resistor 104 which serves for on/off control of the field coil 21 as described hereinbefore. Thus, the output transistor 101 assumes the conducting state (on-state) to allow the field current to flow therethrough. Consequently, the vehicle-onboard generator 2 can assume the state capable of generating electricity.

At this time point, the vehicle-onboard electric generator 2 still remains in the state preceding to the start of electricity generation. Consequently, the transistor 116 is caused to assume the conducting state (i.e., on-state) through the power generation detecting circuitry 119 and the fault diagnosis circuitry 118 both incorporated in the voltage control circuit 1A, which results in that the charge lamp 4 is lit.

When the vehicle-onboard electric generator 2 starts the electric power generation, the power generation detecting circuitry 119 detects the one-phase output (electric power generation output) of the vehicle-onboard generator 2 through the medium of the diode 113 and the capacitor 114 to thereby turn off the transistor 116 by way of the fault diagnosis circuitry 118 for thereby making the charge lamp 4 be extinct.

Further, the output voltage of the vehicle-onboard electric generator 2 is controlled to a predetermined voltage level because the transistor 103 and the output transistor 101 undergo on/off control in response to the output of the comparator 105.

In this manner, the trigger signal can be supplied to the voltage control circuit 1A from the external control unit 5A by way of only the single signal line connected between the monitoring output terminal FR of the voltage control circuit 1A and the external control unit 5A.

More specifically, operation of the voltage control circuit 1A is triggered (i.e., power supply to the voltage control circuit 1A is enabled) in response to the change of the signal level (voltage) appearing at the monitoring output terminal FR as brought about by the external control unit, to thereby allow the vehicle-onboard electric generator 2 to start electric power generation.

Further, in case malfunction takes place in the vehicle-onboard electric generator 2 for some reason, the voltage control circuit 1A can inform the external control unit 5A of abnormality occurrence status. More specifically, the voltage control circuit 1A forcibly changes the signal level making appearance at the monitoring output terminal FR (or imparts a characteristic change to the signal level appearing at the monitoring output terminal FR) to thereby inform the external control unit 5A of the abnormality occurrence status.

As will now be appreciated, by making use of the signal applied to the monitoring output terminal FR via the external control unit 5A as the trigger signal, it is possible to cause the operation trigger circuitry 121 incorporated in the voltage control circuit 1A to operate stably notwithstanding of occurrence of abnormality or fault such as wire breakage of the charge lamp 4 with a simplified structure realized by employing the single signal line. The electric power generation of the vehicle-onboard generator 2 can be started without fail regardless of the type of the charge lamp 4 employed actually.

Furthermore, because a plurality of functions are realized with the single signal line connected to the monitoring output terminal FR, as described above, the amount of wiring internally of the motor vehicle can be reduced as a whole.

Besides, provided that the signal level (a decision voltage of the FR-terminal level discriminating circuitry 123) appearing at the monitoring output terminal FR is "OFF", the logic state in which the output transistor 101 is "OFF" (i.e., at the low level) is satisfied and that this state has continued for a predetermined time, the operation trigger means (123, 121) incorporated in the voltage control circuit 1A interrupts the power supply to the voltage control circuit 1A, as a result of which the electric power generation control is rendered to stop.

Incidentally, in the case where the voltage control circuit 1A is connected to the external control unit 5A through the single signal line dedicated only for fault diagnosis and where the pull-up function of the single signal line can be realized on the side of the external control unit 5A, the pull-up function of the external control unit 5A can be made use of for enabling the power supply to the voltage control circuit 1A.

It should further be added that the external control unit 5A can be implemented not only by the ECU (Electronic Control Unit) installed for the engine control purpose but also by any other appropriate unit such as a power train control module (PTCM) or the like.

Embodiment 2

In the voltage control apparatus for the vehicle-onboard generator according to the first embodiment of the invention, the voltage control circuit 1A is provided with the lamp input terminal L, which may however be spared. A second embodiment of the invention is directed to the structure in which the lamp input terminal L is spared.

Figure 2:
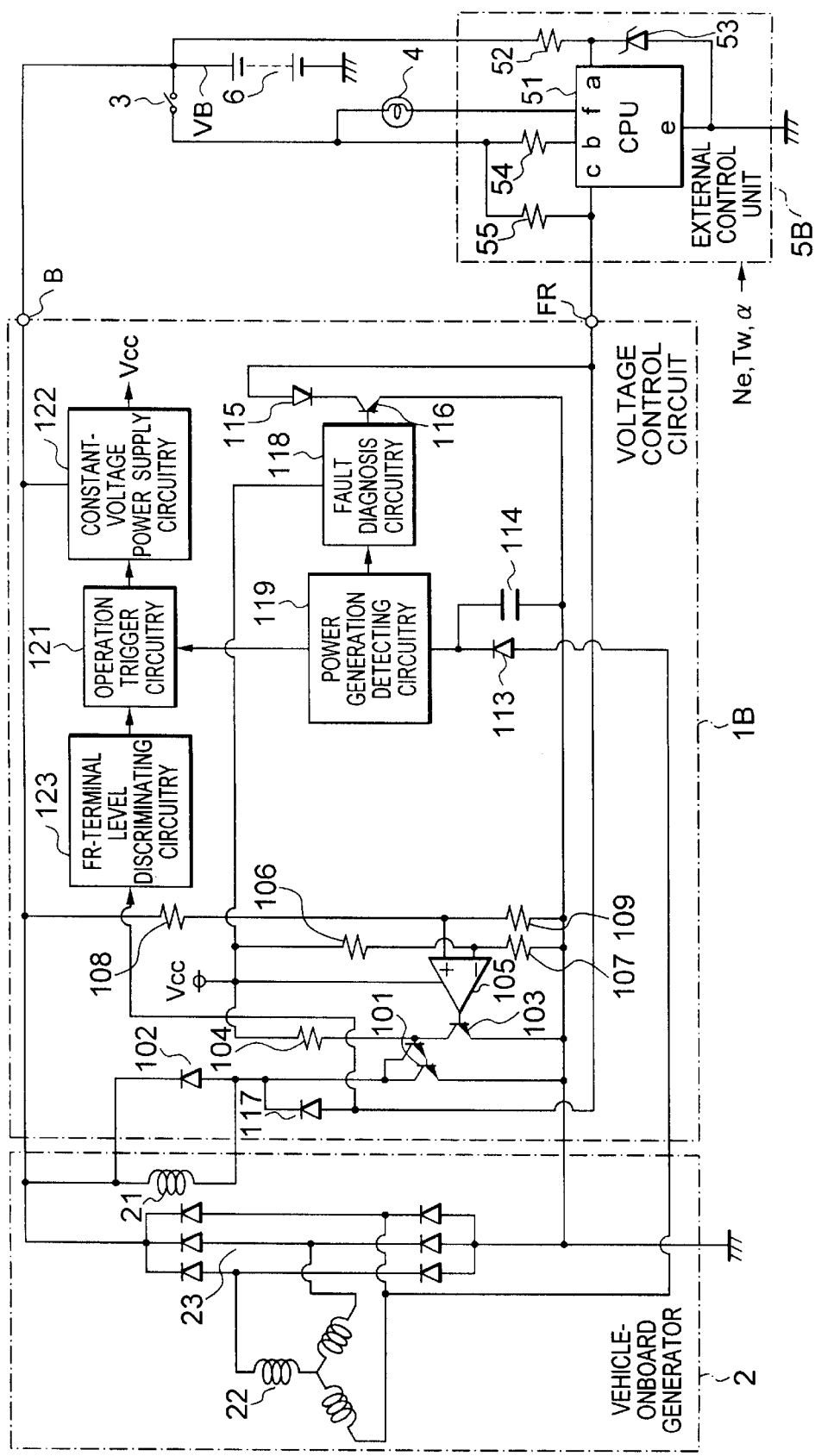
FIG. 2 is a schematic circuit diagram showing a circuit arrangement of a voltage control apparatus for a vehicle-onboard electric generator according to a second embodiment of the present invention, in which a lamp input terminal is omitted.

FIG. 2 is a schematic circuit diagram showing a circuit arrangement of the voltage control apparatus for the vehicle-onboard electric generator according to the second embodiment of the invention, in which the lamp input terminal L is omitted. In the figure, components or parts similar or equivalent to those described by reference to FIGS. 7 and 1 are denoted by like reference symbols affixed or not affixed with "B" as the case may be, and repeated description thereof will be omitted.

In the voltage control apparatus for a vehicle-onboard electric generator according to the second embodiment of the invention, the CPU 51 incorporated in the external control unit 5B is provided with a charge lamp driving port f, wherein the charge lamp 4 is connected between the ignition switch 3 and the charge lamp driving port f.

In the voltage control circuit which is denoted generally by reference symbol 1B and in which the lamp input terminal L (see FIG. 1) is spared, the transistor 116 driven by the fault diagnosis circuitry 118 is connected to the monitoring output terminal FR via the diode 115.

The fault diagnosis circuitry 118 is designed to forcibly fix the signal level appearing at the monitoring output terminal FR to the off-level upon occurrence of abnormality in association with the vehicle-onboard electric generator 2 to thereby inform the external control unit 5B of the abnormality occurrence status.

On the other hand, the external control unit 5B responds to the signal indicating the abnormality occurrence status as inputted via the monitoring input port c to set the charge lamp driving port f to the on-state for thereby driving (i.e., electrically energizing) the charge lamp 4.

Next, description will be directed to operation of the voltage control apparatus 1B for the vehicle-onboard generator according to the second embodiment of the invention by reference to FIG. 2. It should firstly be mentioned that the operation of the trigger circuitry 121 incorporated in the voltage control circuit 1B is similar to that described previously in conjunction with the first embodiment of the invention.

When abnormality occurs in the vehicle-onboard electric generator 2, the transistor 116 incorporated in the voltage control circuit 1B becomes conductive, whereby the signal level (voltage level) at the monitoring output terminal FR is constantly fixed to the level "OFF" (which may also be termed "low level"). Consequently, the external control unit 5B lights the charge lamp 4 for thereby alarming occurrence of abnormality.

As will be appreciated from the above, with the structure of the voltage control apparatus for the vehicle-onboard generator according to the second embodiment of the invention, the number of terminals of the voltage control circuit 1B can further be decreased, whereby the amount of inter-vehicle wiring can be correspondingly reduced owing to such arrangement that the potential at the monitoring output terminal FR is fixed to the level "OFF" for messaging the abnormality occurrence status.

Embodiment 3

In the voltage control apparatus for the vehicle-onboard generator according to the second embodiment of the invention, a plurality of functions are realized by means of the monitoring output terminal FR of the voltage control circuit 1B. However, such plural functions can equally be realized by the control input terminal instead of the monitoring output terminal FR. A third embodiment of the present invention is directed to the voltage control apparatus for the vehicle-onboard electric generator of such arrangement in which plural functions are realized by means of the control input terminal G.

Figure 3:
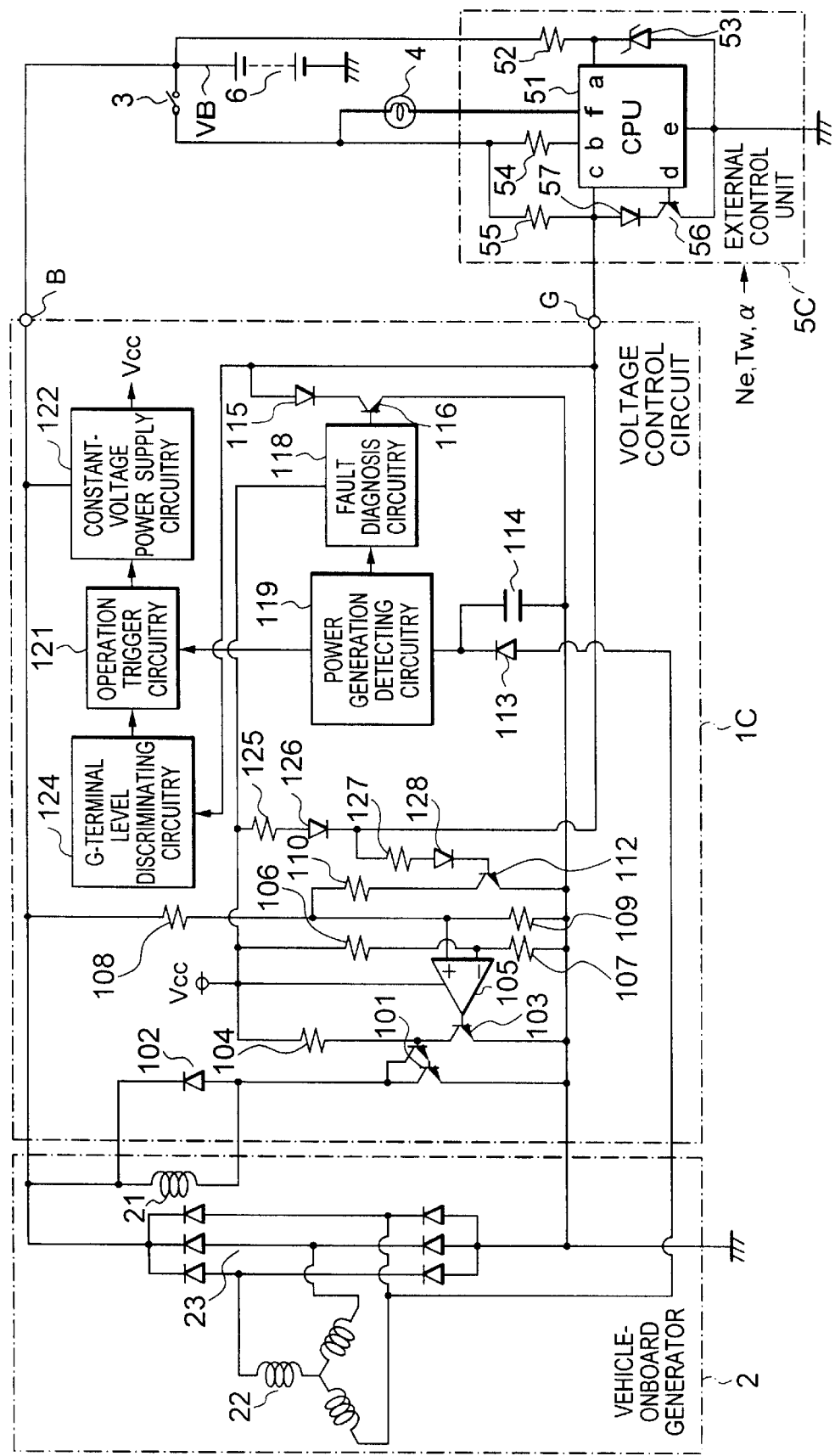
FIG. 3 is a schematic circuit diagram showing a circuit arrangement of a voltage control apparatus for a vehicle-onboard electric generator according to a third embodiment of the present invention, wherein a plurality of functions are realized by a control input terminal.

FIG. 3 is a schematic circuit diagram showing a circuit arrangement of the voltage control apparatus for the vehicle-onboard electric generator according to the third embodiment of the invention, wherein a plurality of functions are realized by the control input terminal G. In the figure, components or parts similar or equivalent to those described by reference to FIGS. 7, 1 and 2 are denoted by like reference symbols affixed or not affixed with "C" as the case may be, and repeated description thereof will be omitted.

Referring to FIG. 3, the voltage control circuit which is denoted generally by reference symbol 1C in this case includes neither the monitoring output terminal FR nor the diode 117 provided in association with the monitoring output terminal FR (refer to FIG. 1). On the other hand, the voltage control circuit 1C includes a G-terminal level discriminating circuitry 124 instead of the FR-terminal level discriminating circuitry 123.

Further, the voltage control circuit 1C includes resistors 125 and 127 and diodes 126 and 128 in association with the transistor 112 and the control input terminal G in addition to the resistor 110 and the transistor 112 described hereinbefore (see FIG. 7).

The diode 126 has a cathode which is connected to the control input terminal G and additionally to a base of the transistor 112 by way of the resistor 127 and the diode 128.

On the other hand, the CPU 51 incorporated in an external control unit 5C includes a diode 57 inserted between the monitoring input port a and the collector of the output transistor 56 in addition to the control output port d and the output transistor 56 described hereinbefore (see FIG. 7) and the charge lamp driving port f also described previously (see FIG. 2).

The monitoring input port c is connected to the control input terminal G of the voltage control circuit 1C. The single signal line interconnecting the voltage control circuit 1C and the external control unit 5C is connected between the control input terminal G and the control output port d via the output transistor 56.

In the voltage control circuit 1C connected to the external control unit 5C via the control input terminal G, the collector (output terminal) of the transistor 116 is connected to the control input terminal G via the diode 115.

The control input terminal G of the voltage control circuit 1C is used for fetching or receiving the control signal for changing the conduction ratio of the field coil from the control output port d of the external control unit 5C.

The external control unit 5C is designed to trigger operation of the voltage control circuit 1C by changing the signal level appearing at the control input terminal G.

On the other hand, the voltage control circuit 1C is so designed that upon occurrence of abnormality in association with the vehicle-onboard electric generator 2, the voltage control circuit 1C forcibly changes the signal level at the control input terminal G, to thereby inform the external control unit 5C of abnormality occurrence status.

In this manner, by inputting the control signal to the control input terminal G from the ignition switch 3 by way of the external control unit 5C to thereby bring about change in the voltage level at the control input terminal G, it is possible to trigger operation of the trigger circuitry 121 to thereby enable the power supply to the voltage control circuit 1C and hence to start the electric power generating operation of the vehicle-onboard generator 2.

Further, when abnormality or fault takes place in association with the vehicle-onboard generator 2, the transistor 116 incorporated in the voltage control circuit 1C becomes electrically conductive (i.e., assumes the state "ON"), whereby the control input terminal G is constantly fixed to the low level (level "OFF"). In response to this, the external control unit 5C electrically energizes the charge lamp 4 to thereby alarm abnormality status.

Thus, advantageous effects similar to those described hereinbefore in conjunction with the second embodiment of the invention can equally be obtained with the arrangement that the voltage control circuit 1C and the external control unit 5C are interconnected via the control input terminal G instead of the monitoring output terminal FR.

Embodiment 4

In the voltage control apparatus for the vehicle-onboard electric generator according to the third embodiment of the invention, a plurality of functions are realized by means of the control input terminal G of the voltage control circuit 1C. However, such plural functions can equally be realized by a one-phase monitoring output terminal P which is electrically connected to the vehicle-onboard generator 2 instead of the control input terminal G. A fourth embodiment of the present invention is directed to the voltage control apparatus for the vehicle-onboard generator of such arrangement in which plural functions are realized by means of the one-phase monitoring output terminal P.

Figure 4:
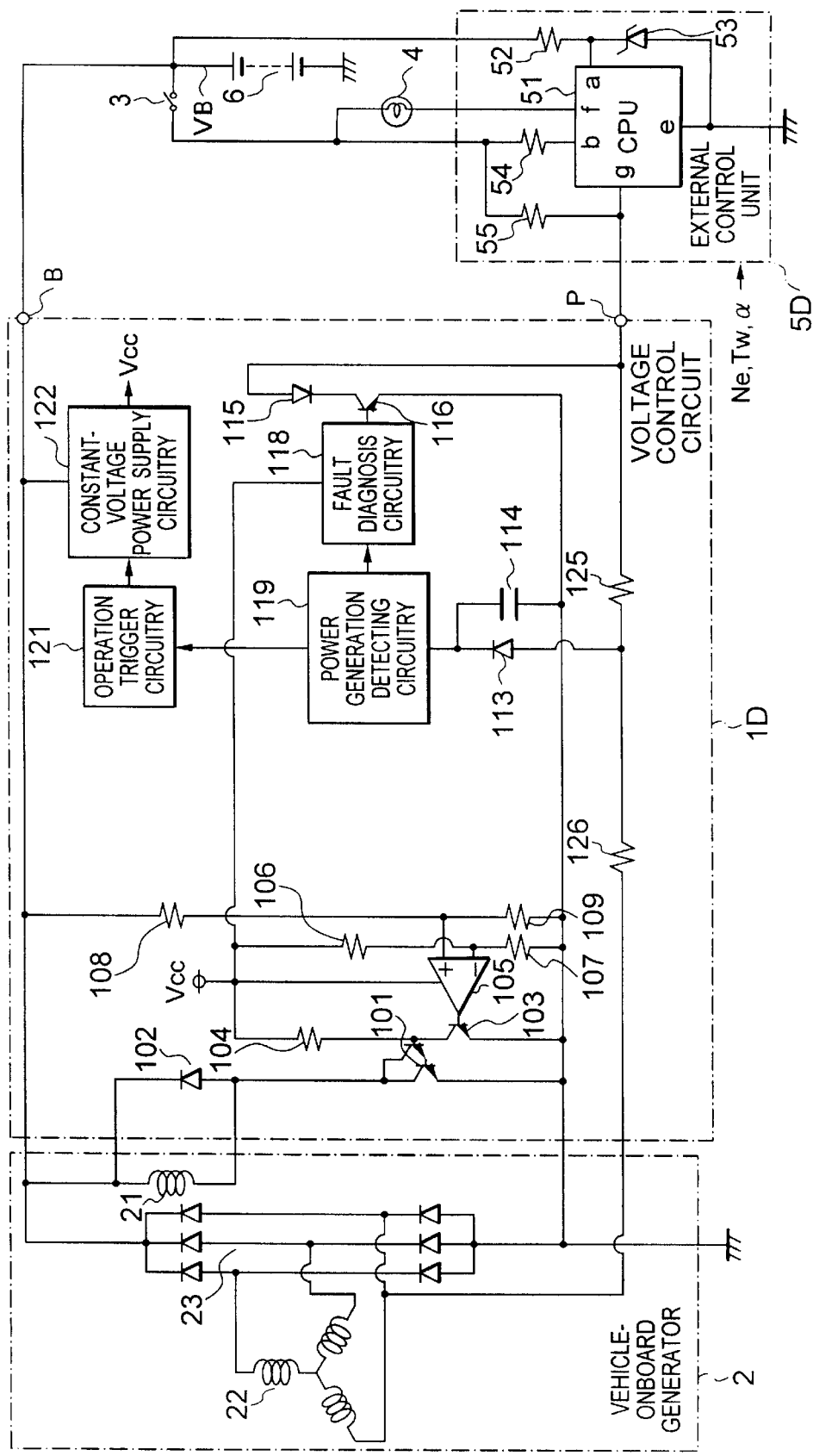
FIG. 4 is a schematic circuit diagram showing a circuit arrangement of a voltage control apparatus for a vehicle-onboard electric generator according to a fourth embodiment of the present invention, wherein a plurality of functions are realized by a one-phase monitoring output terminal.

FIG. 4 is a schematic circuit diagram showing a circuit arrangement of a voltage control apparatus for a vehicle-onboard electric generator according to a fourth embodiment of the present invention, wherein a plurality of functions are realized by the one-phase monitoring output terminal P. In the figure, components or parts similar or equivalent to those described by reference to FIG. 7 and FIGS. 1 to 3 are denoted by like reference symbols affixed or not affixed with "D" as the case may be, and repeated description thereof will be omitted.

In the voltage control apparatus for the vehicle-onboard electric generator according to the instant embodiment of the invention, the CPU 51 incorporated in an external control unit denoted generally by reference symbol 5D is provided with a one-phase monitoring input port g for fetching a one-phase monitor signal for the abnormality status discrimination or decision in place of the monitoring input port c described previously (see FIG. 2).

On the other hand, the voltage control circuit denoted generally by reference numeral 1D in this case is equipped with the one-phase monitoring output terminal P for delivering signal indicative of output from one phase of the vehicle-onboard generator 2 as a one-phase monitor signal, wherein the one-phase monitoring output terminal P is electrically connected to the one-phase monitoring input port g through the medium of the single signal line.

On the other hand, in the voltage control circuit 1D, the terminal level discriminating circuit is spared, and the anode of the diode 115 connected to the transistor 116 for outputting a fault or abnormality indicating signal is connected only to the one-phase monitoring output terminal P.

The external control unit 5D is designed to trigger operation of the voltage control circuit iD by changing the signal level appearing at the one-phase monitoring output terminal P.

On the other hand, the voltage control circuit 1D is so designed that upon occurrence of abnormality or fault in association with the vehicle-onboard generator 2, the voltage control circuit 1D forcibly changes the signal level at the one-phase monitoring output terminal P, to thereby inform the external control unit 5D of abnormality occurrence status.

As is apparent from the above, the one-phase monitoring output terminal P of the voltage control circuit 1D serves not only for outputting the one-phase monitor signal to be supplied to the external control unit 5D but also for triggering or starting the electric power generating operation of the vehicle-onboard generator 2 by enabling power supply to the voltage control circuit 1D on the basis of the change in the voltage level at the one-phase monitoring output terminal P (i.e., change of the voltage applied to the one-phase monitoring output terminal P from the external control unit 5D).

Further, when abnormality takes place in association with the vehicle-onboard generator 2, the one-phase monitor signal is constantly fixed to the low level due to conduction of the transistor 116. In that case, the one-phase monitoring output terminal P serves for informing the external control unit 5D of occurrence of the abnormality status.

As can now be appreciated, the operation trigger circuitry 121 incorporated in the voltage control circuit 1D can be put into operation when the signal is inputted to the one-phase monitoring output terminal P from the ignition switch 3 by way of the external control unit 5D, while upon occurrence of abnormality, the charge lamp 4 is lit by the external control unit in response to the relevant message or information delivered from the voltage control circuit 1D, whereby abnormality alarm is generated.

Embodiment 5

In the voltage control apparatus for the vehicle-onboard generator according to the third embodiment of the invention, the monitoring input port c of the external control unit 5C is connected to the control input terminal G of the voltage control circuit 1C together with the anode of the diode 57 provided in association with the control output port d. However, the monitoring input port c may be connected to the monitoring output terminal FR independently of the diode 57.

Figure 5:
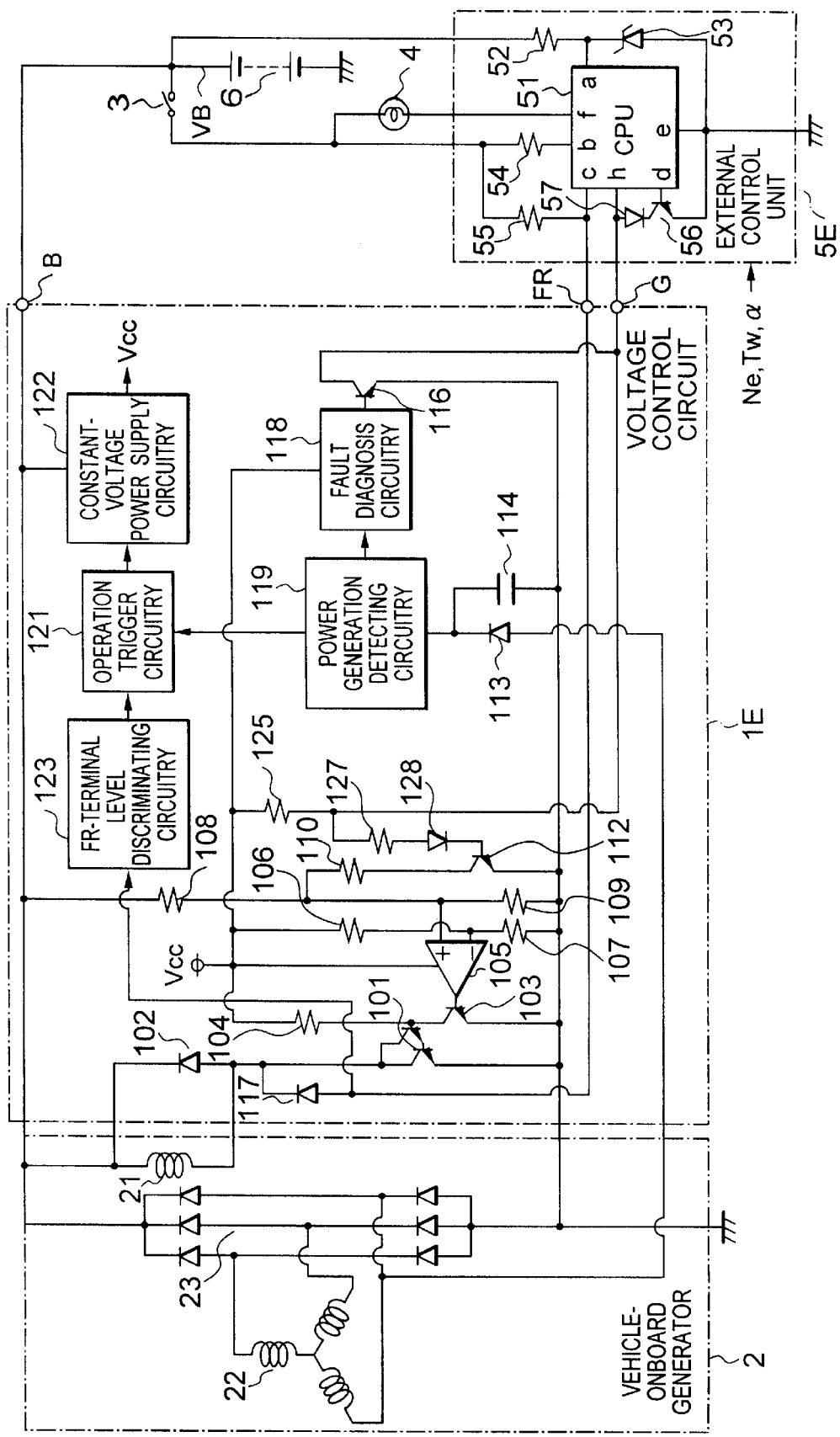
FIG. 5 is a schematic circuit diagram showing a circuit arrangement of a voltage control apparatus for a vehicle-onboard electric generator according to a fifth embodiment of the present invention, wherein a diode is connected to a control input terminal with a monitoring input port being connected to a monitoring output terminal.

FIG. 5 is a schematic circuit diagram showing a circuit arrangement of the voltage control apparatus for the vehicle-onboard generator according to a fifth embodiment of the present invention, wherein the diode 57 is connected to the control input terminal G with the monitoring input port c being connected to the monitoring output terminal FR. In the figure, components or parts similar or equivalent to those described by reference to FIG. 7 and FIGS. 1 to 4 are denoted by like reference symbols affixed or not affixed with "E" as the case may be, and repeated description thereof will be omitted.

In the voltage control apparatus for the vehicle-onboard generator now under consideration, the CPU 51 incorporated in the external control unit denoted by 5E in this instance is implemented substantially in a same structure as that described hereinbefore by reference to FIG. 3 except for the difference that the CPU 51 shown in FIG. 5 is provided with an additional control port h connected to the control input terminal G. Further, the additional control port h is also connected to the anode of the diode 57 provided in association with the control output port d. On the other hand, the monitoring input port c of the CPU 51 is connected to the monitoring output terminal FR.

A voltage control circuit generally denoted by 1E in this instance is provided with the electric power generation output terminal B, the monitoring output terminal FR and the control input terminal G, wherein the collector of the transistor 116 provided in association with the fault diagnosis circuitry 118 is connected to the control input terminal G.

In operation, the external control unit 5E responds to the closing operation (turn-on operation) of the ignition switch 3 by applying the trigger signal to the monitoring output terminal FR to thereby trigger operation of the voltage control circuit 1E.

On the other hand, the voltage control circuit 1E is so designed that upon occurrence of abnormality in association with the vehicle-onboard generator 2, the voltage control circuit 1E forcibly fixes the signal level appearing at the control input terminal G to the off-level (or level "OFF"), to thereby inform the external control unit 5E of abnormality occurrence status.

Thus, the operation trigger circuit 121 incorporated in the voltage control circuit 1E is put into operation in response to the signal inputted to the monitoring output terminal FR from the ignition switch 3 by way of the external control unit 5E, as a result of which electric power generating operation of the vehicle-onboard generator 2 can be started.

Further, when abnormality occurs in association with the vehicle-onboard generator 2, the transistor 116 incorporated in the voltage control circuit 1E becomes electrically conductive, whereby the control input terminal G is constantly fixed to the low level (level "OFF"). In response to this, the charge lamp 4 is electrically energized by the external control unit 5E, whereby the abnormality or fault alarm can be generated.

Furthermore, in the voltage control apparatus for the vehicle-onboard generator according to the instant embodiment of the invention, the voltage control circuit 1E and the external control unit 5E are interconnected by means of two channel signal lines connected to the two terminals FR and G. However, in the voltage control apparatus for the vehicle-onboard generator now under consideration, the lamp input terminal L is spared when compared with the conventional voltage control apparatus for the vehicle-onboard generator shown in FIG. 7. Thus, in addition to the capability of triggering operation of the voltage control circuit 1E even when a fault takes place in association with the charge lamp 4, simplification of the wiring can also be realized.

Embodiment 6

In conjunction with the voltage control apparatus for the vehicle-onboard generator according to the first to fifth embodiments of the invention described above, no description has been made concerning the control based on the timing at which the trigger signal is outputted from the external control unit. A sixth embodiment of the present invention is directed to the voltage control apparatus for the vehicle-onboard generator of such structure that the timing for triggering operation of the vehicle-onboard generator 2, the timing for starting the electric power generation and the start/stop timing can variably or adjustably be set by changing forcibly the output timing of the trigger signal.

Figure 6:
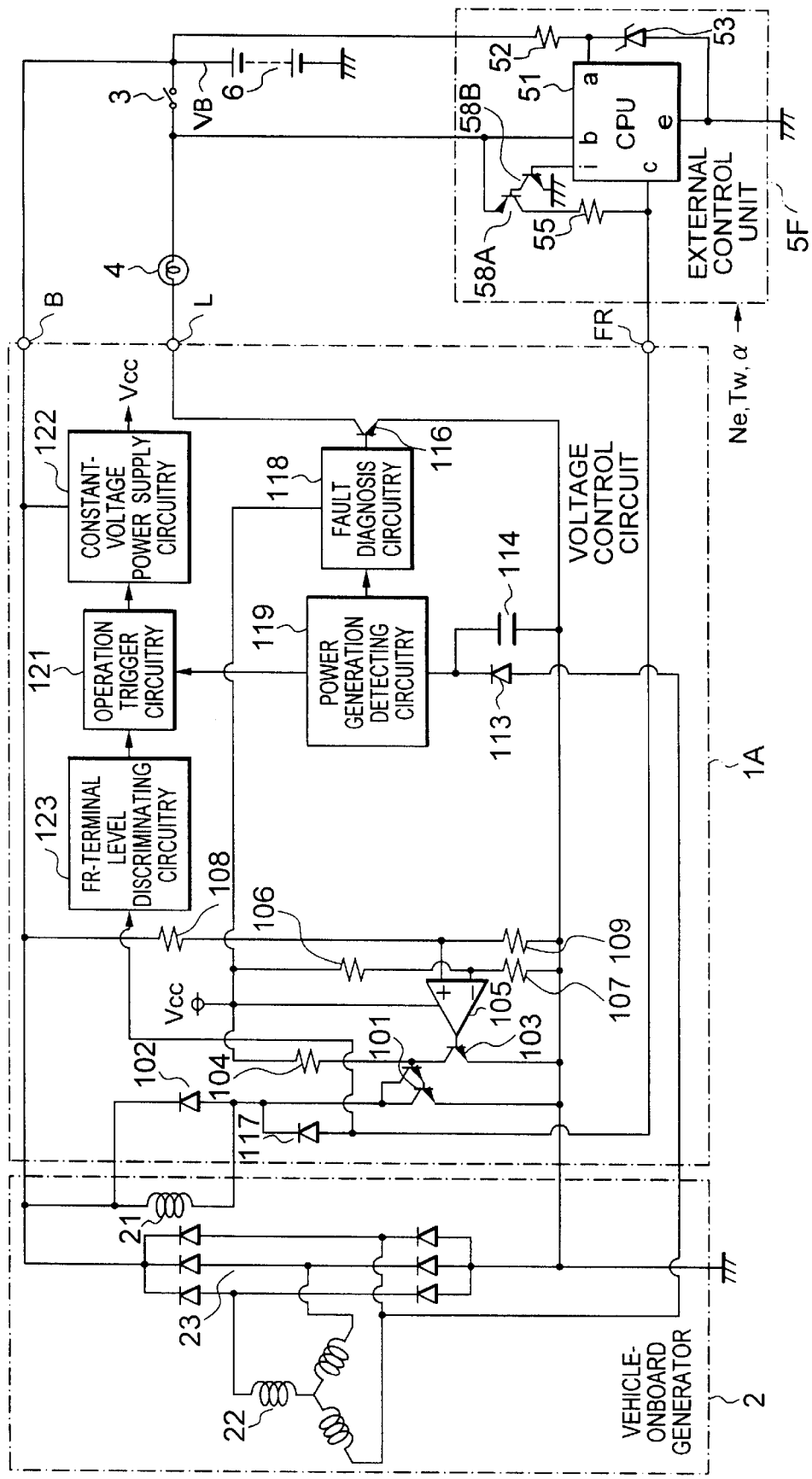
FIG. 6 is a schematic circuit diagram showing a structure of a voltage control apparatus for a vehicle-onboard electric generator according to a sixth embodiment of the present invention in which an electric power generation timing is subjected to a delay control.

FIG. 6 is a schematic circuit diagram showing a structure of the voltage control apparatus for the vehicle-onboard electric generator according to the sixth embodiment of the present invention in which the electric power generation timing is susceptible to a delay control. At this juncture, it should first be mentioned that a power generation timing delay circuit is typically provided in the external control unit of the voltage control apparatus according to the first embodiment of the invention.

In FIG. 6, components or parts similar or equivalent to those described previously by reference to FIG. 1 are denoted by like reference symbols affixed or not affixed with "F" as the case may be, and repeated description thereof will be omitted.

In the voltage control apparatus for the vehicle-onboard generator now under consideration, an external control unit 5F is provided with a power generation timing delay circuit 58 in addition to the structure described hereinbefore by reference to FIG. 1.

The power generation timing delay circuit 58 includes an output transistor 58A inserted between the ignition switch 3 and the resistor 55 and an emitter-grounded control transistor 58B for performing on/off control of the output transistor 58A.

The emitter of the output transistor 58A is connected to the operation triggering port b of the CPU 51, while the collector thereof is connected to the monitoring output terminal FR through the resistor 55.

On the other hand, the CPU 51 is provided with a delay control port i for driving the control transistor 58B of the power generation timing delay circuit 58.

The external control unit denoted generally by 5F in this instance adjusts and alters the output timing of the trigger signal which determines the time point for starting the power generating operation of the vehicle-onboard electric generator 2 by adjusting or regulating the output timing of the control signal from the delay control port i in dependence on the engine operation state.

By way of example, the external control unit 5F can adjust and alter or change the output timing of the trigger signal on the basis of the desired rotation number Neo during the starting period of the engine (not shown) in which the vehicle-onboard generator 2 is driven on the basis of the temperature Tw of the cooling water.

More specifically, the external control unit 5F is so designed as to alter forcibly the signal application timing for the monitoring output terminal FR of the voltage control circuit 1A in dependence on the information of engine operation states obtained from the various sensors such as the engine rotation number Ne, cooling water temperature Tw, depression stroke of the accelerator pedal and the like.

Thus, the timing for putting into operation the trigger circuitry 121 incorporated in the voltage control circuit 1A, the timing for starting the power generating operation of the vehicle-onboard generator 2 and others can be adjusted, changed or altered as desired.

Furthermore, the external control unit 5F can be so designed as to arbitrarily set the timing for triggering operation of the vehicle-onboard generator 2, the timing for electric power generation and the timing for stopping the operation of the vehicle-onboard generator 2 by changing forcibly the timing at which the trigger signal is applied to the voltage control circuit 1A.

Additionally, the external control unit 5F can be so designed that the delay of the electric power generation by the vehicle-onboard generator 2 at the time point of the engine starting operation is optimized by altering appropriately the output timing of the trigger signal in dependence on the information of engine operation states (e.g. desired rotation number Neo, cooling water temperature Tw and the like) acquired in the engine starting phase.

As will be appreciated from the above, owing to such arrangement of the voltage control apparatus according to the instant embodiment of the invention that the delay of the time point for starting the power generating operation of the vehicle-onboard generator 2 is adjusted and altered appropriately in accordance with a number of various sensor signals inputted to the external control units 5A to 5E, it is possible to reduce operation loss of the vehicle-onboard generator 2 upon engine starting, whereby starting performance and fuel cost performance of the engine of the motor vehicle can be improved or enhanced significantly.

Since the delay time can be changed or modified in dependence on the desired rotation number Neo which is determined by taking into account the cooling water temperature Tw and the like at the time point of engine starting operation phase, a preferred power generation delay control can be realized even when the engine is started from the cold state (i.e., from the state where the engine is not warmed up yet).

The power generation timing delay circuit 58 can find application to any one of the first to fifth embodiments (FIGS. 1 to 5) in addition to the sixth embodiment of the invention, whereby substantially same effects described above can be obtained.

Further, by incarnating the teachings of the invention described above in conjunction with the sixth embodiment of the invention in the first to fifth embodiments, advantageous effects such as improvement of the engine starting performance and the fuel cost performance can equally be ensured.

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A voltage control apparatus for a vehicle-onboard electric generator, comprising:
    a vehicle-onboard electric generator driven by an internal combustion engine and including an armature coil and a field coil;
    a voltage control circuit including an output transistor for controlling a voltage appearing across said field coil to thereby control a generated voltage of said vehicle-onboard electric generator;
    an external control unit having an output for supplying a trigger signal to said voltage control circuit; and
    a single signal line for electrically interconnecting a first terminal of said voltage control circuit and a first port of said external control unit,
    wherein said external control unit is so designed as to output the trigger signal to said voltage control circuit by way of said single signal line, and
    wherein said voltage control circuit is so designed that upon occurrence of abnormality in association with said vehicle-onboard electric generator, said voltage control circuit informs said external control unit of abnormality occurrence status through the medium of said single signal line.

2. A voltage control apparatus for a vehicle-onboard electric generator according to claim 1,
    wherein said external control unit is so designed as to put into operation said voltage control circuit by changing a signal level appearing at said first terminal.

3. A voltage control apparatus for a vehicle-onboard electric generator according to claim 1,
    wherein said voltage control circuit is so designed that upon occurrence of abnormality in association with said vehicle-onboard electric generator, said voltage control circuit forcibly changes a signal level appearing at said first terminal to thereby inform said external control unit of abnormality occurrence status.

4. A voltage control apparatus for a vehicle-onboard electric generator according to claim 3, further comprising:
    a charge lamp driving port provided in association with said external control unit; and
    a charge lamp electrically connected to said charge lamp driving port,
    wherein said voltage control circuit is so designed that upon occurrence of abnormality in association with said vehicle-onboard electric generator, said voltage control circuit forcibly fixes the signal level appearing at said first terminal at an off-level to thereby inform said external control unit of abnormality occurrence status; and
    wherein said external control unit is so designed as to respond to said abnormality occurrence status to thereby drive said charge lamp.

5. A voltage control apparatus for a vehicle-onboard electric generator according to claim 1,
    wherein said first terminal of said voltage control circuit is implemented as a monitoring output terminal electrically connected to said field coil of said vehicle-onboard electric generator for outputting a monitor signal indicative of electrical conduction ratio of said field coil; and
    wherein said first port of said external control unit is implemented as a monitoring input port for receiving said monitor signal.

6. A voltage control apparatus for a vehicle-onboard electric generator according to claim 5,
    said voltage control circuit including operation trigger means designed to respond to a signal level of said monitor signal,
    wherein said operation trigger means is so designed that when said monitor signal is at a level "OFF" and when said output transistor assumes an electrically nonconducting state, said operation trigger means interrupts power supply to said voltage control circuit to thereby cause electric power generation control for said vehicle-onboard electric generator to be stopped.

7. A voltage control apparatus for a vehicle-onboard electric generator according to claim 6,
    wherein said operation trigger means is so designed that when said monitor signal is at a level "OFF" and when the off-state of said output transistor has continued for a predetermined time, said operation trigger means interrupts power supply to said voltage control circuit to thereby cause the electric power generation control for said vehicle-onboard electric generator to be stopped.

8. A voltage control apparatus for a vehicle-onboard electric generator according to claim 1,
    wherein said first terminal of said voltage control circuit is implemented as a control input terminal for receiving a control signal for changing over conduction ratio of said field coil; and
    wherein said first port of said external control unit is implemented as a control output port for outputting said control signal.

9. A voltage control apparatus for a vehicle-onboard electric generator according to claim 1,
    wherein said first terminal of said voltage control circuit is implemented as a one-phase monitoring output terminal for outputting a one-phase monitor signal indicative of the one-phase output of said vehicle-onboard electric generator; and
    wherein said first port of said external control unit is implemented as a one-phase monitoring input port for receiving said one-phase monitor signal.

10. A voltage control apparatus for a vehicle-onboard electric generator according to claim 1,
    wherein said external control unit is so designed as to forcibly change output timing of said trigger signal on the basis of information concerning engine operation states to thereby set variably an operation trigger timing, an electric power generation starting time point, operation and stop timings of said vehicle-onboard electric generator.

11. A voltage control apparatus for a vehicle-onboard electric generator according to claim 10,
    wherein said external control unit is so designed as to adjust and alter an output timing of said trigger signal for determining the electric power generation starting time point of said vehicle-onboard electric generator on the basis of a desired rotation number of said engine in a starting operation phase thereof.

12. A voltage control apparatus for a vehicle-onboard electric generator according to claim 10, wherein said external control unit is so designed as to adjust and alter said output timing of said trigger signal for thereby determining the electric power generation starting time point of said vehicle-onboard electric generator on the basis of a temperature of cooling water of said engine in the starting operation phase thereof.

13. A voltage control apparatus for a vehicle-onboard electric generator according to claim 10, wherein said external control unit is so designed as to adjust and alter said output timing of said trigger signal for thereby determining the electric power generation starting time point of said vehicle-onboard electric generator on the basis of at least one of said desired rotation number (rpm) of said engine and temperature of cooling water in the starting operation phase thereof.

14. A voltage control apparatus for a vehicle-onboard electric generator, comprising:

a vehicle-onboard electric generator including an armature coil and a field coil;

a voltage control circuit including an output transistor for controlling a voltage appearing across said field coil to thereby control a generated voltage of said vehicle-onboard electric generator; and an external control unit having an output for supplying a trigger signal to said voltage control circuit, said voltage control circuit including a monitoring output terminal electrically connected to said field coil of said vehicle-onboard electric generator for outputting a monitor signal indicative of electrical conduction ratio of said field coil and. a control input terminal for fetching a control signal for changing over the electrical conduction ratio of said field coil; and said external control unit including an operation triggering port electrically connected to an ignition switch, a monitoring input port for fetching said monitor signal from said monitoring output terminal and a control output port for outputting said control signal to be supplied to said control input terminal;

wherein said external control unit is so designed as to respond to closing operation of said ignition switch to apply a trigger signal to said monitoring output terminal for triggering operation of said voltage control circuit; and wherein said voltage control circuit is so designed that upon occurrence of abnormality in said vehicle-onboard electric generator, said voltage control circuit forcibly fixes a signal level appearing at said control input terminal at an off-level to thereby inform said external control unit of abnormality occurrence status.

15. A voltage control apparatus for a vehicle-onboard electric generator according to claim 14, further comprising:

a charge lamp driving port provided in association with said external control unit; and a charge lamp electrically connected to said charge lamp driving port, wherein said external control unit is so designed as to respond to said abnormality occurrence status to thereby drive said charge lamp.

16. A voltage control apparatus for a vehicle-onboard electric generator according to claim 14, wherein said external control unit is so designed as to forcibly change output timing of said trigger signal on the basis of information concerning engine operation states to thereby set variably operation trigger timing, electric power generation starting time point, operation and stop timings of said vehicle-onboard electric generator.

17. A voltage control apparatus for a vehicle-onboard electric generator according to claim 16, wherein said external control unit is so designed as to adjust and alter an output timing of said trigger signal for thereby determining the electric power generation starting time point of said vehicle-onboard electric generator on the basis of a desired rotation number (rpm) of said engine in a starting operation phase thereof.

18. A voltage control apparatus for a vehicle-onboard electric generator according to claim 16, wherein said external control unit is so designed as to adjust and alter an output timing of said trigger signal for thereby determining the electric power generation starting time point of said vehicle-onboard electric generator on the basis of a temperature of cooling water of said engine in the starting operation phase thereof.

19. A voltage control apparatus for a vehicle-onboard electric generator according to claim 16, wherein said external control unit is so designed as to adjust and alter an output timing of said trigger signal for thereby determining the electric power generation starting time point of said vehicle-onboard electric generator on the basis of at least one of said desired rotation number (rpm) of said engine and temperature of cooling water in the starting operation phase thereof.

\* \* \* \* \*